United States Patent
Rebello

(10) Patent No.: US 10,605,398 B2
(45) Date of Patent: Mar. 31, 2020

(54) REMOTELY CONTROLLED PIPELINE SECTION INTERNAL REPAIR DEVICE AND INSTALLATION METHOD

(71) Applicant: Stress Engineering Services, Inc., Houston, TX (US)

(72) Inventor: Armando Rebello, Cypress, TX (US)

(73) Assignee: Stress Engineering Services, Inc., Houston, TX (US)

(*) Notice: Subject to any disclaimer, the term of this patent is extended or adjusted under 35 U.S.C. 154(b) by 152 days.

(21) Appl. No.: 15/890,175

(22) Filed: Feb. 6, 2018

(65) Prior Publication Data

US 2018/0224046 A1 Aug. 9, 2018

Related U.S. Application Data

(60) Provisional application No. 62/455,283, filed on Feb. 6, 2017.

(51) Int. Cl.
| | |
|---|---|
| *F16L 55/18* | (2006.01) |
| *F16L 55/163* | (2006.01) |
| *F16L 55/1645* | (2006.01) |
| *F16L 55/165* | (2006.01) |

(52) U.S. Cl.
CPC ......... *F16L 55/163* (2013.01); *F16L 55/1645* (2013.01); *F16L 55/1651* (2013.01); *F16L 55/18* (2013.01)

(58) Field of Classification Search
CPC .. F16L 55/165; F16L 55/1652; F16L 55/1653

USPC .............. 138/97, 98; 166/277; 405/184.1; 156/293, 294, 94
See application file for complete search history.

(56) References Cited

U.S. PATENT DOCUMENTS

| | | | |
|---|---|---|---|
| 4,197,880 A | | 4/1980 | Cordia |
| 4,273,605 A | * | 6/1981 | Ross .................. B08B 9/047 138/140 |
| 4,691,740 A | * | 9/1987 | Svetlik ................ B29C 49/26 138/104 |
| 5,035,539 A | | 7/1991 | Kawafuji et al. |
| 5,042,532 A | | 8/1991 | Gilleland |
| 5,119,862 A | * | 6/1992 | Maimets ............... F16L 55/163 138/97 |
| 5,203,377 A | | 4/1993 | Harrington |
| 5,351,720 A | * | 10/1994 | Maimets ............... F16L 55/163 138/98 |
| 5,560,395 A | | 10/1996 | Bissonnette et al. |
| 5,765,597 A | | 6/1998 | Kiest, Jr. et al. |
| 5,794,663 A | | 8/1998 | Kiest, Jr. et al. |
| 6,105,619 A | | 8/2000 | Kiest, Jr. |
| 6,138,718 A | | 10/2000 | Maimets |
| 6,199,591 B1 | | 3/2001 | Kiest, Jr. et al. |
| 6,641,687 B2 | | 11/2003 | Kiest, Jr. et al. |
| 7,717,137 B2 | | 5/2010 | Bednarzik |

(Continued)

*Primary Examiner* — Patrick F Brinson
(74) *Attorney, Agent, or Firm* — Christopher McKeon; Arnold & Saunders, LLP

(57) ABSTRACT

An example embodiment includes a remotely controlled pipeline section internal repair device. In some embodiments, the repair apparatus comprises elastomer seal rings that expand between an apparatus internal metal sleeve and the inner diameter of the pipe. The mechanical pressure exerted by the elastomer rings is such that the apparatus contains the internal fluid, as well as prevents ingress of external fluid when the pipeline is submerged.

24 Claims, 4 Drawing Sheets

(56) References Cited

U.S. PATENT DOCUMENTS

| | | | |
|---|---|---|---|
| 7,987,873 B2 | 8/2011 | Kiest, Jr. | |
| 8,783,297 B2 * | 7/2014 | Hawwa | F16L 55/163 |
| | | | 138/118 |
| 8,925,590 B2 | 1/2015 | Khalifa et al. | |
| 9,261,217 B2 | 2/2016 | Jackson | |
| 2001/0039711 A1 | 11/2001 | Donnelly et al. | |
| 2007/0284011 A1 * | 12/2007 | Freyer | E21B 33/1208 |
| | | | 138/90 |
| 2013/0248042 A1 * | 9/2013 | Charest | F16L 55/163 |
| | | | 138/141 |

* cited by examiner

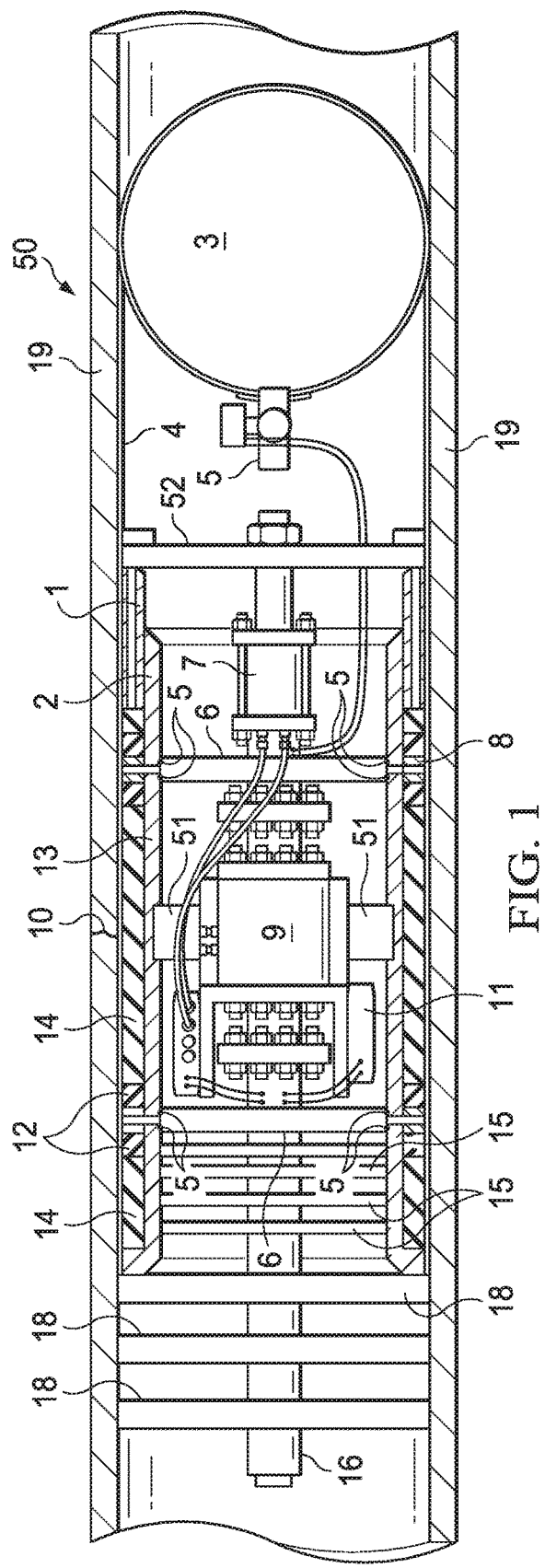
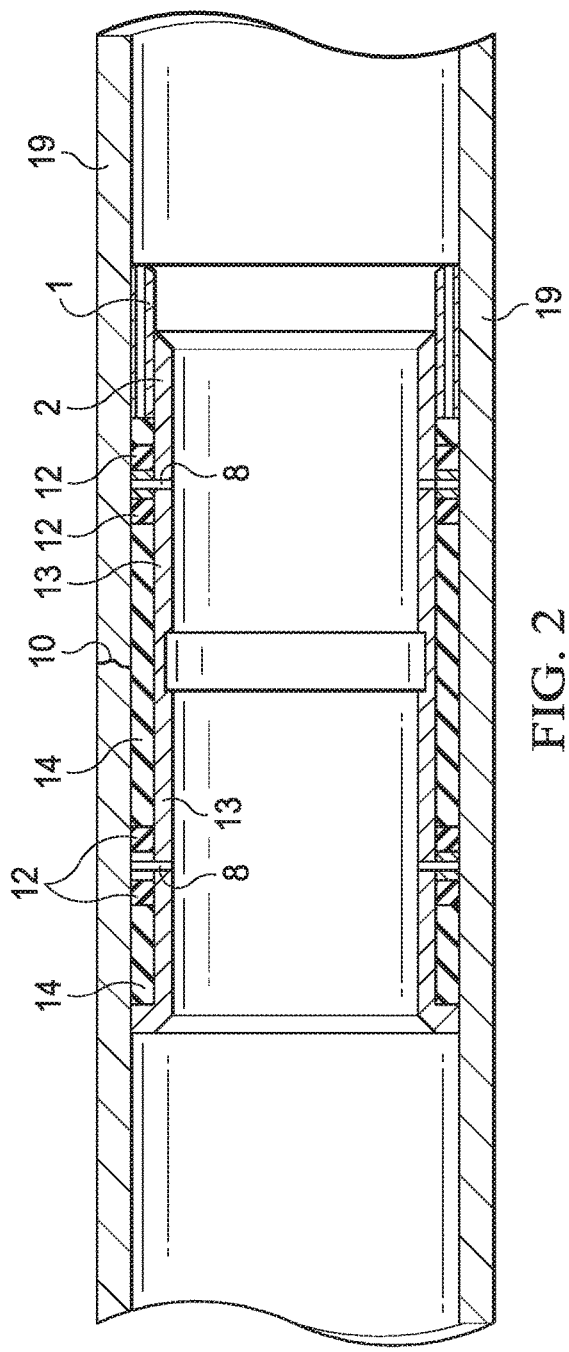
FIG. 1
FIG. 2

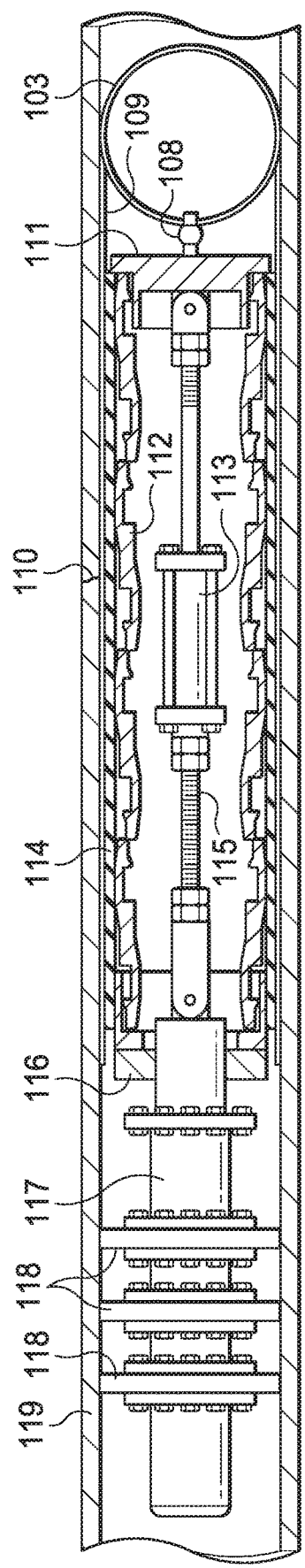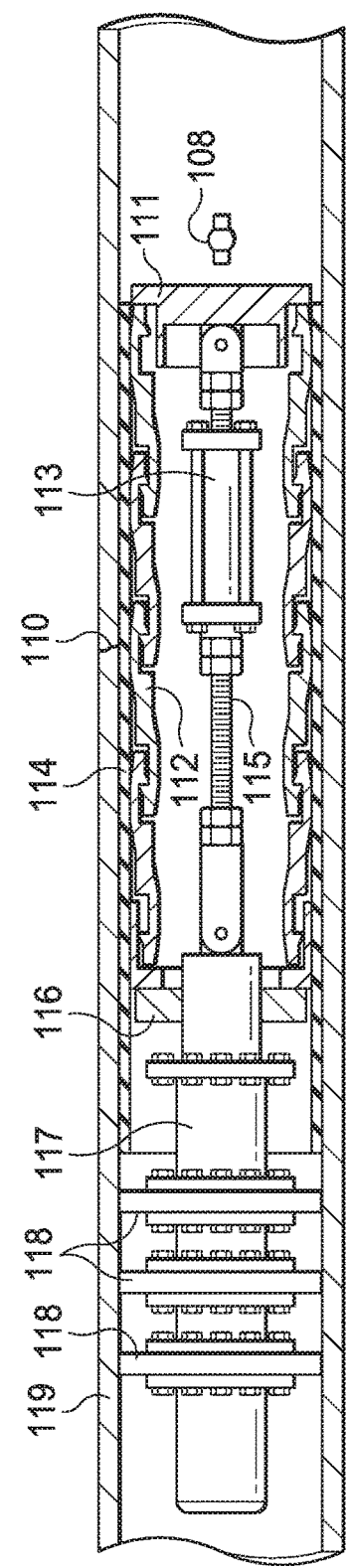
FIG. 3
FIG. 4

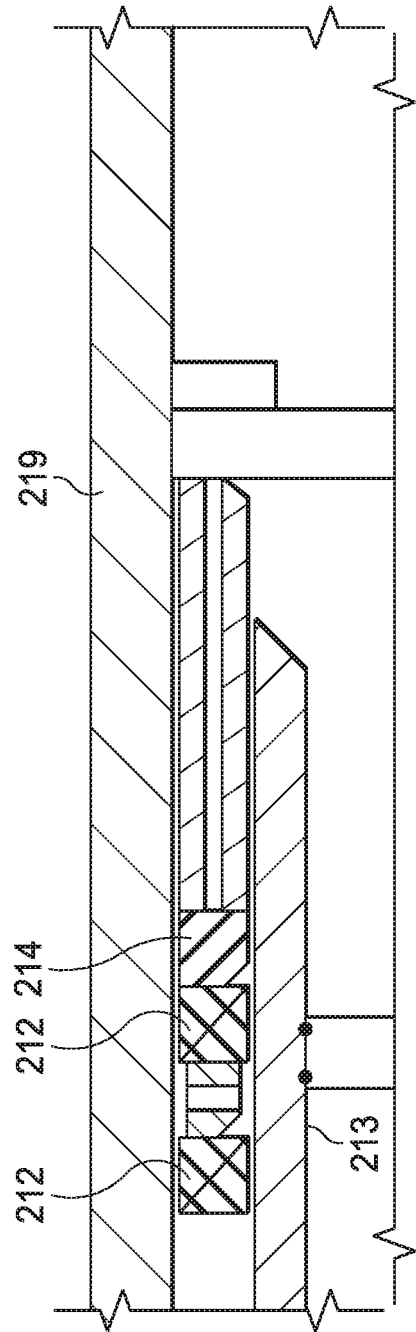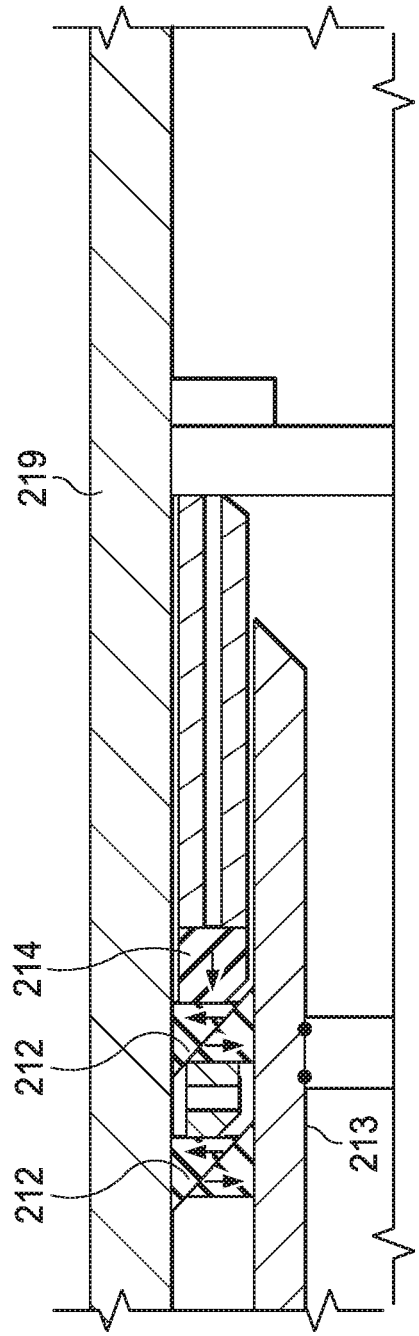

REMOTELY CONTROLLED PIPELINE SECTION INTERNAL REPAIR DEVICE AND INSTALLATION METHOD

RELATED APPLICATION

This application claims priority to U.S. Provisional Application No. 62/455,283, filed Feb. 6, 2017, titled "Remotely Controlled Pipeline Section Internal Repair Device and Installation Method."

BACKGROUND

Pipelines exist around many human activities. They are considered as a safe means of transportation for many products, including water, oil products, gas products, sewer, and slurries.

Occasionally, pipelines fail as a result of handling accidents, excavation activities, fatigue due to traffic on road and railway crossings, fabrication defects on base metal, welding defects, excessive bending loads, internal or external corrosion, etc.

Sometimes, pipelines are installed in difficult to reach areas, or areas that became difficult to reach due to population expansion over the years, pipelines installed in wetlands or subsea. In such cases, it would be best to reach the damaged area through the inner diameter by pumping the repair set to the area to be repaired. Sometimes, corrosion is widespread through the pipeline and the whole pipeline length needs remediation.

In some cases, there are external repair alternatives, however these are usually time consuming, expensive and in the case of subsea pipeline repair, may involve the mobilization of offshore going vessels, cranes and other costly appurtenances. For wetlands, sometimes there is a requirement for establishing a hyperbaric atmospheric chamber for welding work to take place.

Of paramount importance for repairs aimed at underwater repair is resistance to internal pressure and external pressure, including collapse of the repair sleeve or liner.

Prior art in this area includes a number of resin based repair systems (U.S. Pat. No. 9,261,217 B2—Expandable Pipeline Point-Repair Device, U.S. Pat. No. 5,203,377—Method of Repairing a Pipeline and Apparatus for Use in Such a Method, U.S. Pat. No. 5,765,597—Apparatus for Repairing a Pipeline and Method for Using Same, U.S. Pat. No. 5,794,663—Apparatus for Repairing a Pipeline and Method for Using Same, U.S. Pat. No. 6,105,619—Apparatus for Repairing a Pipeline and Method for Using Same, U.S. Pat. No. 6,199,591 B1—Method of Using Detachable Lines for Positioning Pipeline Repair Liner, U.S. Pat. No. 5,351,720—Apparatus for Repairing Conduits, U.S. Pat. No. 5,560,395—Apparatus and Method for Repairing Underground Conduits in Situ, U.S. Pat. No. 6,138,718—Apparatus and Method for Repairing Pressure Pipes and U.S. Pat. No. 7,987,873 B2—Device and Method for Repairing Pipe), or bladder based systems (U.S. Pat. No. 6,641,687 B2—Apparatus for Repairing a Pipeline and Method for Using Same and U.S. Pat. No. 7,717,137 B2—Internal Pipe Repair Method and Device), or tape application systems (U.S. Pat. No. 8,925,590 B2—Pipeline Leak Detection and Repair Device), or heat expandable polymers (U.S. Pat. No. 4,197,880—Sealing and Insulating Article and Method) or thin spiral rolled sheets (U.S. Pat. No. 5,042,532—Expandable Tube Apparatus for Repairing Pipelines and U.S. Pat. No. 5,119,862—Conduit Repair Apparatus), sometimes aided by expanding internal sheets which slide over ratchets, and in some other cases based on installing liners against the inner wall of the pipeline to be repaired (U.S. Pat. No. 5,035,539—Liner for Pipeline Repair and Method for Repairing Pipelines and U.S. Pat. No. 5,203,377—Method of Repairing a Pipeline and Apparatus for Use in Such a Method). There exist a need for improved collapse resistant, high pressure and temperature oil and gas pipelines remediation methods and systems.

SUMMARY OF EXAMPLE EMBODIMENTS

The disclosed technology described therein addresses a need, unfulfilled in the previous art, for providing a remotely controlled pipeline section internal repair device (RCPSIRD), aimed at an extensive range of pressures and temperatures and including collapse resistance. One important characteristic of this device is the predictability of the seal pressure, which can be customized to the desired pipeline operating pressure and collapse depth. Another important feature is that this system is purely mechanic and does not rely on resin curing. Resin cured repair sleeves, once cured, don't accommodate temperature variations such as seen in the oil and gas industry, and may crack or form gaps when the pipeline expands or contracts due to changes in temperature. Also, resin repairs are sensitive to water (case of blistering and delamination) and may be sensitive to chemicals such as corrosion inhibitors, hydrate inhibitors or oxygen scavengers commonly used by the oil and gas industry.

In some embodiments, an outer protective shell will be installed so as to protect the internal seal mechanisms thereof, while the remotely controlled pipeline section repair device is pushed into the repair location, which could be a fairly long distance. The protective shell is ejected once the RCPSIRD reaches the repair location.

In some embodiments, a longitudinal cylindrical ratchet is actuated by a hydraulic, pneumatic or electric drive mechanism, until the desired elastomer seal pressure is achieved.

In some embodiments, a pressure vessel containing an inert gas is used to test the annular space between multiple seals, to ensure the device is properly set. In some embodiments, a longitudinal cylindrical ratchet is actuated by a hydraulic, pneumatic or electric drive mechanism, until sliding wedge solid seal rings achieve the desired seal pressure.

In some embodiments, a hydraulic or electric drive mechanism actuates a complex geometry sleeve until it "clicks" at its setting position. The complex geometry sleeve thereof is custom designed so the elastic forces within the sleeve compress an elastomeric sleeve between said sleeve and the pipeline inner diameter at a predetermined pressure thereof.

In some embodiments, a serrated sleeve or set of serrated segments (or suitably threaded sleeve or threaded segments for manufacturing convenience) is provided to grip the pipeline on both ends of the RCPSIRD thus ensuring the structural integrity of the repair, in which case the repair system will structurally reinforce the damaged section, in addition to sealing a leak. Such embodiments are therefore called a Remotely Controlled Pipeline Section Internal Structural Repair Device (RCPSISRD).

In all embodiments, the inner core containing the hydraulic, pneumatic, hydraulic and electronic core is ejected and driven out of the pipeline by pressure applied to the driving fluid. In all embodiments, a set of sleeves will remain inside the pipeline. It is expected that the pipeline will be operational at full or reduced flowrate depending on the geometry of the sleeves thereof. In all embodiments, material selection will be a function of the pipeline design pressure and temperature.

An example embodiment may include a device that is set for localized internal repairs for medium to high pressures (ANSI Class 150 to ANSI Class 2500) and temperatures in excess of 250° F. as found in oil and gas pipelines. The device may be resistant to external pressure and collapse in the event the repaired pipeline is depressurized. The device may be inserted many miles away from the damaged area to be repaired and sent to the desired location using the "good" portion of the pipeline. It may be equipped with longitudinal ratchets to ensure proper compression of the repair seals. It may repair pipeline cracks using mechanical actuation, via electric, pneumatic or hydraulic actuators. It may be self-transported and remotely actuated. It may provide a fast response to polluting spills. It may eliminate the need for pipe handling tools such as lift frames, cutting tools, end preparation tools, outer coating removal tool for concrete, corrosion protection coats, or thermal insulation coats. It can repair pipe-in-pipe (as used offshore) inner pipe without the need to remove the outer pipe. It may provide a local repair that is completely independent of curable composites. It may leave a cylindrical sleeve supporting a mechanical, polymer or solid, wedge design seal ring driven by a longitudinal ratchet system. It may include a cylindrical outer protective shell that protects the repair apparatus while it is being pumped to the repair location. It may include an inner body having of a plurality of electronic detection, sensors, controls, batteries, pressurized gas, digital communication devices, actuators, locking mechanisms and propelling disks. It may include an inner body that is removable once repairs are complete. It may include a reusable test device to ensure the sealing system is properly set. It may include a set of complex geometry sleeves that can be designed to impose the necessary seal pressure. It may include a repair system that permits the calculation and prediction of the sealing parameters, in accordance to a pipeline maximum allowable design pressure, or any desirable pressure thereof, in addition to external pressure effects.

An example embodiment may include a method to remotely install a pipeline section internal repair device by sending the device to the desired repair location by pumping fluid behind the repair device, thus making it be displaced for the necessary distance and determining its location using a combination of one or more acoustic, electric or magnetic signal detection to determine its location within a pipeline. Using a combination of one or more sensors or other instrumentation external to the repair tool may be used in conjunction with assist the repair tool including human handled systems or robotic systems such as remotely operated vehicles (ROVs).

An example embodiment may include an internal pipeline repair device having an outer cylindrical sleeve with a first end and an second end, a cylindrical inner sleeve inner sleeve located within the outer sleeve and having a first end and a second end, a cylindrical pipe seal sleeve located in between the inner sleeve and the outer sleeve, a tool body located within the inner sleeve having a plurality of radial connection pins engaged to the inner sleeve, a ratcheting means for locking the pipe seal sleeve in place, a plurality of radial seals located between the inner sleeve and the outer sleeve, and proximate to the cylindrical pipe seal sleeve.

Further variations may include the plurality of radial seals may be elastomer seals. The plurality of radial seals may be graphite wedge shaped rings. The first end of the inner sleeve may be in contact with the pipeline after the outer cylindrical sleeve is removed. The ratcheting means may include using interlocking teeth that are set by the actuator and locked in place by the radial force of the inner sleeve against an internal wall of a pipeline. The cylindrical pipe seal sleeve may be an elastomer sleeve. The tool body may have an actuator coupled to a cylindrical disk proximate to the second end of the pipe seal sleeve, wherein the actuator can apply an axial force against the pipe seal sleeve. The first end may have a plurality of elastomer disks. The second end may have a spherical or non spherical pressure chamber integrally with the outer sleeve, wherein the pressure chamber can remove the outer sleeve from the repair device by releasing pressurized gas. It may have radial elastomer disks coupled to the first end of the inner sleeve adapted to allow the pipeline repair device to be pumped through a pipeline. The radial connection pins can disengage, allowing the tool body to be pumped further downhole and leave the inner sleeve and pipe seal in place.

An example embodiment may include an internal pipeline repair device having an outer cylindrical sleeve with a first end and an second end, a cylindrical inner sleeve inner sleeve located within the outer sleeve and having a first end and a second end, a means for compressing an elastomer sleeve outward against a portion of the inner wall of a pipeline, a tool body located within the means for compressing an elastomer sleeve having a plurality of radial connection pins engaged to the means for compressing an elastomer sleeve. A variation of the example embodiment may include the means for compressing an elastomer sleeve against a portion of the inner wall of a pipeline being a series of complex geometry links that lock together and expand outwards when subject to an axial load. The tool body may have an actuator coupled to a cylindrical disk proximate to the second end of the means for compressing an elastomer sleeve, wherein the actuator can apply an axial force against the pipe seal sleeve. The first end of the tool body may have a plurality of elastomer disks. The second end may have a spherical or non-spherical pressure chamber integrally with the outer sleeve, wherein the pressure chamber can remove the outer sleeve from the repair device by releasing pressurized gas. The radial elastomer disks coupled to the first end of the tool body may be adapted to allow the pipeline repair device to be pumped through a pipeline. The radial connection pins can disengage, allowing the tool body to be pumped further downhole and leave the inner sleeve and pipe seal in place.

An example embodiment may include a method for repairing an internal portion of a pipeline including identifying a desired location of pipeline damage, inserting a repair tool into the pipeline, propelling the repair tool to the desired location, confirming the repair tool is at the desired location, setting an internal seal outward against the inner wall of the pipeline at the desired location, removing the repair tool from the pipeline. Propelling the repair tool may include pumping the repair tool to the desired location of the pipeline. Setting the seal may include compressing an elastomer outwardly against the inner wall of the desired location of the pipeline. Setting the seal may include compressing a wedge outwardly against the inner wall of the desired location of the pipeline. Setting the seal may include compressing a means for sealing outwardly against the inner wall of the desired location of the pipeline. The means for sealing outwardly may include forcing interlocking links together to apply an outward force against a cylindrical elastomer seal located proximate to the inner wall of the desired location of the pipeline. It may include pressure testing the internal seal after it is set against the inner wall of the pipeline. It may include ejecting a protective cylindrical cover from the repair tool after pumping it to the desired location of the pipeline. It may include disengaging connection pins holding the internal seal with the repair tool, wherein the repair tool can be pumped away from the set internal seal.

BRIEF DESCRIPTION OF THE DRAWINGS

FIG. 1 shows a cross section of a multi-elastomer seal RCPSIRD inside a pipeline.

FIG. 2 shows a cross section of the RCPSIRD after the repair is complete and the inner componentry is recovered.

FIG. 3 shows a cross section of a complex geometry sleeve RCPSIRD in a travel configuration, inside a pipeline.

FIG. 4 shows a cross section of a complex geometry sleeve RCPSIRD in a locked configuration.

FIG. 6 shows a detail of an embodiment of non-elastomeric seals in the resting position.

FIG. 7 shows a detail of an embodiment of the non-elastomeric seals in the actuated position.

DETAILED DESCRIPTION OF THE EXAMPLE EMBODIMENTS

Figure 5:
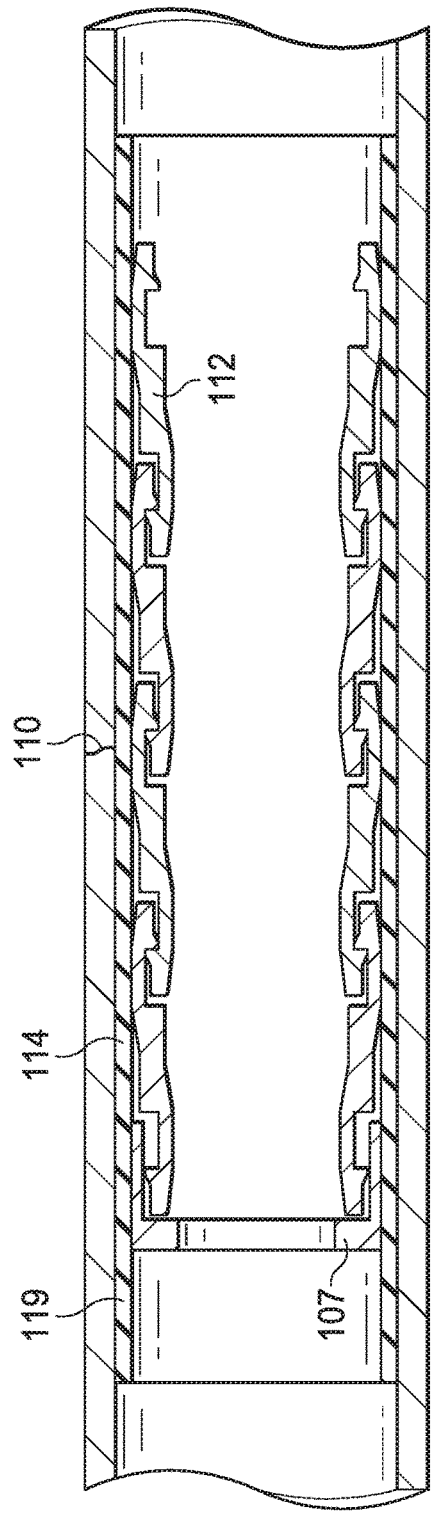
FIG. 5 shows a cross section of a complex geometry sleeve RCPSIRD in a locked configuration after the repair is complete and the inner componentry is recovered.

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

An example embodiment may include a Remotely Controlled Pipeline Section Internal Repair Device (RCPSIRD) comprising a generally cylindrical protective steel sleeve mounted over the main body of the repair apparatus. The outer sleeve is not permanent to the repair process and is ejected upon an electronic, acoustic or magnetic command. In some embodiments, the repair apparatus comprises elastomer seal rings that expand between an apparatus internal metal sleeve and the inner diameter of the pipe. The mechanical pressure exerted by the elastomer rings is such that the apparatus contains the internal fluid, as well as prevents ingress of external fluid when the pipeline is submerged. In other embodiments, the sealing method is by using of multiple sliding rings that wedge against each other thus creating a pressure thereof between an apparatus internal sleeve and the pipeline internal diameter. In other embodiments, the repair apparatus comprises an elastomeric sleeve which is compressed by a complex geometry set of interlocked elements thereof, creating a pressure between the referred elements and the internal diameter of the pipeline, thus containing the internal fluid, as well as preventing ingress of external fluid when the pipeline is submerged. The apparatuses, in their various embodiments function under the action of hydraulic, pneumatic or electric actuation thereof.

The presently disclosed technology is directed toward a remotely controlled pipeline section Internal repair device, where it is acceptable for the repair component to reduce the pipeline internal diameter, which may be acceptable since pipeline cleaning, monitoring or inspection devices may be able to be designed to accept such reduction thereof, needed for the high pressure containment of oil and gas pipelines.

FIG. 1 shows a cross section of a RCPSIRD, in its non-structural form. The tool 50 is launched from a suitable location and travels a distance required for the correct position at the repair location, propelled by internal pipeline pressure and fluids acting on propelling disks 18. Propelling disks 18 seal against the inside diameter of the pipeline 19. Elastomer disks 15 seal against the inner sleeve 13. Elastomer disk 15 and propelling disks 18 are located on cylinder 16 that is connected to tool body 9. During repairs, "upstream" indicates where the repair system comes from and "downstream" indicates where the repair system goes to, which may be the opposite of the pipelines normal operation depending on where the tool 50 is launched in the pipeline and where it is sent.

In this example the failure is shown as a crack 10 in pipeline 19, however it could be another anomaly that requires repair. The tools location is verified by electronic detection, either by a technician holding a detector, or by a remotely operated vehicle (ROV). Once in location, a solenoid valve 5 is actuated and the outer sleeve 4 is ejected to the right due to the release of pressurized gas from pressure chamber 3. The tool body 9 contains a plurality of electronics detection, sensors, controls, batteries, pressurized gas, digital communication, etc. On external remote command, the actuator 7 pulls cylindrical plate 52 towards the actuator 7, thereby compressing elastomer seals 12. Note the entire fixture is connected to the inner sleeve 13 through a set of connecting pins 51. The actuator motion causes the ratchets 1, 2 to move against the elastomer seals 12 in a "squeeze" motion, up to a preset force. If included, test gas is then released into the test ring 6 through the lantern rings 8 (note the 'O' rings 5 for sealing the gas path to the seal area). If no leaks are detected between the seals 12, the system will signal that the internal test is acceptable. An electronic command is sent to the internal module 9 and the connecting pins 51 are retracted, thus disconnecting the internal module 9 from the sleeve 13. Once the system signals that the inner module 9 is disconnected, the pipeline 19 is pressurized from the propelling disks 18 side and the inner module 9 is pumped to the other end of the pipeline, where it is then recovered, leaving the elastomer sleeve 14, the elastomer seals 12, the inner sleeve 13, the lantern rings 8, and the ratchets 1 and 2 behind in the pipeline 19.

The tool body 9 may include inert gas for pressure testing the elastomer seals 12.

FIG. 2 shows the componentry of the repaired pipeline 19. Inner sleeve 13 is in place, sealing against crack 10. Elastomer seals 12 in combination with lantern rings 8 hold the elastomer sleeve 14 in place. The ratchets 1 and 2 will maintain the force on the elastomer seals 12 for the lifetime of the repair.

In an example embodiment shown in FIG. 3, the RCPSIRD will use complex geometry sleeves 112. The tool is launched from a suitable location and travels a distance required for the correct position at the repair location, propelled by internal pipeline pressure and fluids acting on propelling disks 118. In this example the failure is shown as a crack 110 in pipeline 119, however it could be another anomaly that requires repair. The tools location is verified by electronic detection, either by a technician holding a detector, or by a remotely operated vehicle (ROV). The detection tool could use various technologies thereof. Once in location, a solenoid valve 108 is actuated and the outer sleeve 109 is ejected to the right by releasing pressure from pressure chamber 103. The tool body 117 contains a plurality of electronics detection, controls, batteries, pressurized gas, etc. On external remote command, the actuator 113 pulls to the left. Threads 115 allow for adjusting the tool prior to deploying in pipeline 119. Note the inner body reacts to the actuator 113 via plate 111 pulling towards reaction pins 116. Once sufficient pull force is applied, the complex geometry sleeves "click" together. The complex geometry sleeves are designed to apply specific pressure on an elastomer sleeve 114 when forced to "click" by actuator 113.

Figure 8:
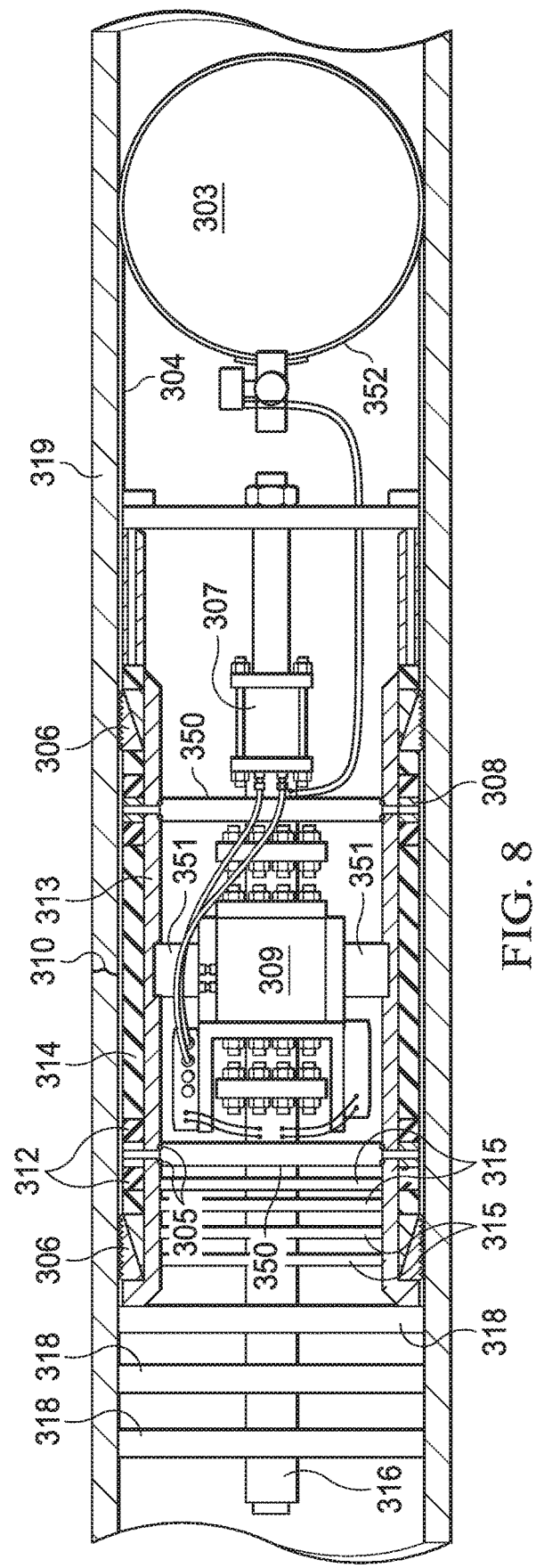
FIG. 8 shows a Remotely Controlled Pipeline Section Internal Structural Repair Device (RCPSISRD) with its serrated structural grippers on both ends.

FIG. 4 depicts an example embodiment of the actuated RCPSIRD after the outer sleeve has been ejected by bleed valve 108. The actuator 113 pulls the cylindrical disk 111 inwards, thus engaging the complex geometry sleeve 112. The apexes of the complex geometry sleeve 112 exerts pressure on the elastomer sleeve 114 to form a seal against pipeline 119. This allows for sealing against a non-ideal surface in pipeline 119. This configuration may also be equipped with an annular test device and structural grips as shown in FIG. 8. Once the repair of the pipeline crack 110 is completed, the reaction pins 116 are retracted thus disconnecting the inner body from the now interconnected complex geometry sleeves, the pipeline is pressurized from the propelling disks 118 side, and the tool body 117 is pumped down the pipeline, where it is then recovered.

FIG. 5 depicts an example embodiment of the componentry of the repaired pipeline. In this example pipeline 119 with crack 110 is repaired with elastomer sleeve 114 held in place with complex geometry sleeves 112 in combination with actuator 107.

FIG. 6 shows a detail of an example embodiment were the seal is a solid, non-elastomeric material used when high temperature is present. In FIG. 6 the elastomeric seal is in the resting position. In this case the pusher ring 214 actuates seals 212 using ratchets 201 and 202 to apply an axial force, seals against pipeline 219. When repairing high temperature pipelines, the solid seal system is made of two wedge shaped rings which slide over each other. The wedge angle is calculated so that an adequate sealing pressure is attained. Actuation of the cylindrical disk will force the mechanical (split) seal 212 to displace against the pipeline 219 inner diameters, and against the sleeve 213.

FIG. 7 shows a detail of an embodiment were the seal is a solid, non-elastomeric material, representing the seal engaged. Instead of a "squeeze-expand" method as shown in FIG. 2, the elastomer seals 212 are replaced by two wedges, which seal when the upper wedge slides over the lower one. In FIG. 6, the wedges 212 are in their resting position. In FIG. 7 the actuator 214 has moved against the wedges 212, making the upper wedge act against the pipe 219, and the lower wedge to act against the sleeve 213. The method shown in FIGS. 6 and 7 is a variation of the general method shown in the rest of the description. The wedges 212 may be made of a non-elastomeric material, such as graphite, which has a low coefficient of thermal expansion.

In some embodiments, as shown in FIG. 8, the tool will have additional structural grips or sleeves 306, which when actuated through actuator 307 will structurally bond the sleeve 313 to the pipeline 319. The tool is launched from a suitable location and travels a distance required for the correct position at the repair location, propelled by internal pipeline pressure and fluids acting on propelling disks 318 and elastomer disk 315. Elastomer disk 315 and propelling disks 318 are located on cylinder 316 that is connected to tool body 309. In this example the failure is shown as a crack 310, however it could be another anomaly that requires repair. The tools location is verified by electronic detection, either by a technician holding a detector, or by a remotely operated vehicle (ROV). The detection tool could use various technologies thereof. Once in location, a solenoid valve 352 is actuated, releasing pressure from pressure chamber 303, causing the outer sleeve 304 to eject. The tool body 309 contains a plurality of electronics detection, sensors, controls, batteries, pressurized gas, digital communication, etc. On external remote command, the actuator 307 pulls inwards. Note the entire fixture is connected to the inner sleeve 313 through a set of connection pins 351. The actuator motion causes the ratchets 301 and 302 to move against the elastomer seals 312 and sleeves 306 in a "squeeze" motion, up to a preset force. This force acts outwardly against the elastomer sleeve 314 and hence the inner diameter of pipeline 319, sealing pipeline crack 310. If included, test gas is then let pass through the test ring 350 through the lantern rings 308 (note the 'O' rings 305 for sealing the gas path to the seal area). If no leaks are present between the seals 312, the system will signal that the internal test is acceptable. An electronic command is sent to the internal module 309 and the connecting pins 351 are retracted, thus disconnecting the internal module 309 from the sleeve 313. Once the system signals that the inner module 309 is disconnected, the pipeline 319 is pressurized from the propelling disk 318 side and the inner module 309 is pumped through the pipeline, where it is then recovered.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and should not be restrictive. All and any changes that come within the meaning and range of equivalency of the claims are to be embraced within their scope. Combination of any of the methods, systems and devices described herein above are also contemplated and within the scope of the invention.

The invention claimed is:

1. An internal pipeline repair device, comprising:
    an outer cylindrical sleeve with a first end and an second end;
    a cylindrical inner sleeve inner sleeve located within the outer sleeve and having a first end and a second end;
    a cylindrical pipe seal sleeve located in between the inner sleeve and the outer sleeve;
    a tool body located within the inner sleeve having a plurality of radial connection pins engaged to the inner sleeve, wherein the radial connection pins can disengage, allowing the tool body to be pumped further downhole and leave the inner sleeve and pipe seal in place;
    a ratcheting means for locking the pipe seal sleeve in place by the radial force of the inner sleeve against an internal wall of a pipeline;
    a plurality of radial seals located between the inner sleeve and the outer sleeve, and proximate to the cylindrical pipe seal sleeve.

2. The apparatus of claim 1, wherein the plurality of radial seals are elastomer seals.

3. The apparatus of claim 1, wherein the plurality of radial seals are graphite wedge shaped rings.

4. The apparatus of claim 1, wherein the first end of the inner sleeve is in contact with the pipeline after the outer cylindrical sleeve is removed.

5. The apparatus of claim 1, wherein the ratcheting means includes interlocking teeth that are set by the actuator and locked in place by the radial force of the inner sleeve against an internal wall of a pipeline.

6. The apparatus of claim 1, wherein the cylindrical pipe seal sleeve is an elastomer sleeve.

7. The apparatus of claim 1, further comprising the tool body having an actuator coupled to a cylindrical disk proximate to the second end of the pipe seal sleeve, wherein the actuator can apply an axial force against the pipe seal sleeve.

8. The apparatus of claim 1, further comprising the first end of the outer cylindrical sleeve having a plurality of elastomer disks.

9. The apparatus of claim 1, further comprising the second end of the outer cylindrical sleeve having a spherical or non spherical pressure chamber integrally with the outer sleeve, wherein the pressure chamber can remove the outer sleeve from the repair device by releasing pressurized gas.

10. The apparatus of claim 1, further comprising radial elastomer disks coupled to the first end of the inner sleeve adapted to allow the pipeline repair device to be pumped through a pipeline.

11. An internal pipeline repair device, comprising:
    an outer cylindrical sleeve with a first end and an second end;
    a cylindrical inner sleeve inner sleeve located within the outer sleeve and having a first end and a second end;
    a cylindrical elastomer sleeve located in between the inner sleeve and the outer sleeve;
    a means for compressing the elastomer sleeve outward against a portion of the inner wall of a pipeline;
    a tool body located within the means for compressing the elastomer sleeve having a plurality of radial connection pins engaged to the means for compressing the elastomer sleeve, wherein the radial connection pins can disengage, allowing the tool body to be pumped further downhole and leave the inner sleeve and pipe seal in place.

12. The apparatus of claim 11, wherein the means for compressing the elastomer sleeve against a portion of the inner wall of a pipeline includes a series of complex geometry links that lock together and expand outwards when subject to an axial load.

13. The apparatus of claim 11, further comprising the tool body having an actuator coupled to a cylindrical disk proximate to the second end of the means for compressing the elastomer sleeve, wherein the actuator can apply an axial force against the elastomer sleeve.

14. The apparatus of claim 11, further comprising the first end of the tool body having a plurality of elastomer disks.

15. The apparatus of claim 11, further comprising the second end of the outer cylindrical sleeve having a pressure chamber integrally with the outer sleeve, wherein the pressure chamber can remove the outer sleeve from the repair device by releasing pressurized gas.

16. The apparatus of claim 11, further comprising radial elastomer disks coupled to the first end of the tool body adapted to allow the pipeline repair device to be pumped through a pipeline.

17. A method for repairing an internal portion of a pipeline comprising:
    identifying a desired location of pipeline damage;
    inserting a repair tool into the pipeline;
    pumping the repair tool to the desired location;
    confirming the repair tool is at the desired location;
    setting an internal seal outward against the inner wall of the pipeline at the desired location;
    disengaging connection pins holding the internal seal with the repair tool, wherein the repair tool can be pumped away from the set internal seal; and
    removing the repair tool from the pipeline.

18. The method of claim 17 wherein the propelling the repair tool includes pumping the repair tool to the desired location of the pipeline.

19. The method of claim 17 wherein setting the seal includes compressing an elastomer outwardly against the inner wall of the desired location of the pipeline.

20. The method of claim 17 wherein setting the seal includes compressing a wedge outwardly against the inner wall of the desired location of the pipeline.

21. The method of claim 17 wherein setting the seal includes compressing a means for sealing outwardly against the inner wall of the desired location of the pipeline.

22. The method of claim 17 wherein the means for sealing outwardly includes forcing interlocking links together to apply an outward force against a cylindrical elastomer seal located proximate to the inner wall of the desired location of the pipeline.

23. The method of claim 17 further comprising pressure testing the internal seal after it is set against the inner wall of the pipeline.

24. The method of claim 17 further comprising ejecting an outer cylindrical sleeve from the repair tool after pumping the repair tool to the desired location of the pipeline.

* * * * *